United States Patent [19]

Willis

[11] 3,984,864
[45] Oct. 5, 1976

[54] GATING CIRCUIT FOR A VIDEO DRIVER INCLUDING A CLAMPING CIRCUIT

[75] Inventor: Donald Henry Willis, Indianapolis, Ind.

[73] Assignee: RCA Corporation, New York, N.Y.

[22] Filed: May 23, 1975

[21] Appl. No.: 580,688

[52] U.S. Cl. .................................................. 358/33
[51] Int. Cl.² ........................................... H04N 3/24
[58] Field of Search ................. 358/34, 33, 30, 6, 7, 358/10, 14; 178/7.5 R, 7.5 DC

[56] References Cited
UNITED STATES PATENTS

| | | | |
|---|---|---|---|
| 3,436,475 | 4/1969 | Zimmerman et al. | 178/7.5 R |
| 3,446,915 | 5/1969 | Voige | 178/7.5 R |
| 3,639,685 | 2/1972 | Morio | 358/30 |
| 3,663,745 | 5/1972 | O'Toole | 358/30 |
| 3,763,315 | 10/1973 | Norman | 178/7.5 R |

*Primary Examiner*—Robert L. Griffin
*Assistant Examiner*—Aristotelis M. Psitos
*Attorney, Agent, or Firm*—Eugene M. Whitacre; Peter M. Emanuel; Ronald H. Kurdyla

[57] ABSTRACT

An amplifier for combining color difference signals with luminance signals and driving a color image reproducing device includes first and second transistors of opposite conductivity type. Color difference signals are capacitively coupled to the base of the first transistor. The emitter of the first transistor is direct current coupled to the emitter of the second transistor. Luminance signals are coupled to the base of the second transistor. Color signals developed at the collector of the first transistor are coupled to the image reproducing device. The base-emitter junction of the first transistor is also direct current coupled in feedback relation across the collector-base junction of a third transistor of like conductivity type. The emitter of the third transistor is coupled to a gating circuit which couples a reference voltage to the emitter of the third transistor to cause the third transistor to conduct during each horizontal retrace interval. As a result, the emitter of the first transistor is clamped substantially to the reference voltage to thereby determine the operating point of the first transistor. The gating circuit also selectively couples a signal to the emitter of the first transistor to render the image reproducer cut-off during the horizontal trace portion of the vertical retrace interval so that disconcerting horizontal scan lines are not visible during vertical retrace. The gating circuit is arranged so that the signal to cut off the image reproducing device during vertical retrace is disconnected from the emitter of the first transistor during the horizontal retrace intervals so as not to interfere with the clamping operation of the first and third transistors.

10 Claims, 1 Drawing Figure

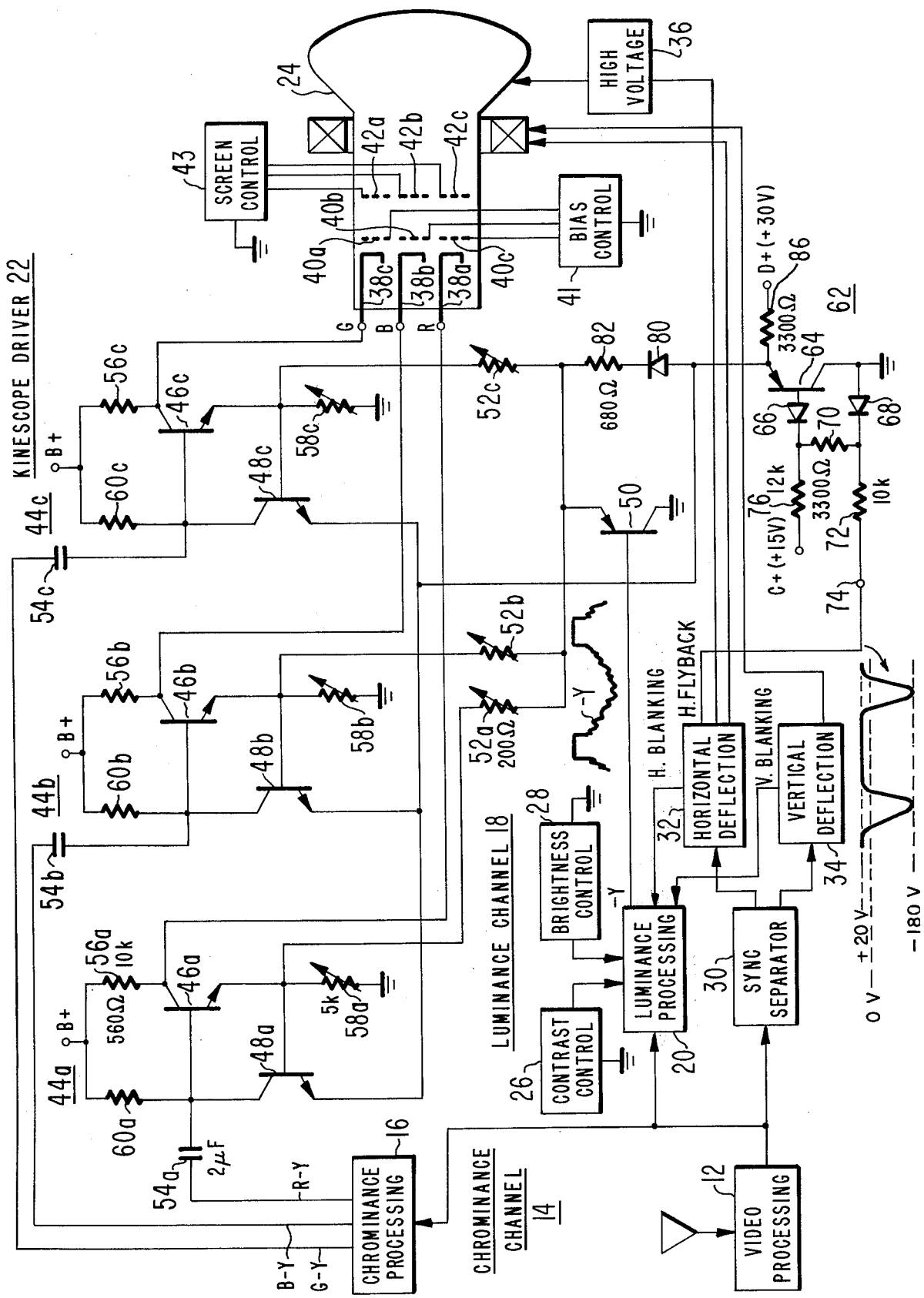

GATING CIRCUIT FOR A VIDEO DRIVER INCLUDING A CLAMPING CIRCUIT

The present invention is directed to apparatus for controlling the operation of an image reproducing device and is particularly directed to video driver circuits for controlling the operation of a kinescope.

Television signal processing systems, such as television receivers, typically include a kinescope for reproducing an image in response to video signals. One or more electron beams generated by the kinescope are deflected to produce a horizontal trace line on the screen of the kinescope which is modulated in accordance with the video signals during "horizontal trace" intervals. When an electron beam has reached the end of a horizontal line, it is rapidly deflected back to the beginning of the next horizontal line during a "horizontal retrace" interval. The electron beam is also vertically deflected at a slower rate during a "vertical trace" interval until the beam has been scanned, line by line, to the bottom of the screen. When the beam has reached the bottom of the screen, it is deflected back to the top of the screen during a "vertical retrace" interval. Since the vertical retrace interval is longer than the horizontal trace and retrace intervals, the electron beam is horizontally deflected several times during the vertical retrace interval. As a result, a disconcerting zig-zag line pattern may be produced unless the kinescope is rendered inoperative or "blanked" during the horizontal trace portions of vertical retrace.

Various kinescope drivers are known for controlling a kinescope in response to video signals. In my co-pending U.S. Pat. application Ser. No. 504,357, entitled "Circuit for Maintaining Operating Point Stability of an Amplifier," filed on Sept. 9, 1974, which is assigned to the same assignee as the present invention, there is described an amplifier for combining color difference signals with luminance signals to drive a color kinescope. The amplifier includes a clamping circuit which operates during horizontal retrace to stabilize the operating point of the amplifier.

Although horizontal and vertical blanking pulses, having time durations respectively corresponding to the horizontal and vertical retrace intervals, are typically inserted in the luminance signal coupled to the kinescope drivers, the blanking pulses may be insufficient under certain conditions, such as the presence of noise or other undesirable signals, to render the kinescope inoperative to produce an electron beam. Such noise may result in the above-noted undesirable zig-zag trace pattern being produced during the horizontal trace portions of the vertical retrace interval.

In accordance with the present invention, a gating circuit, which may be utilized in conjunction with the type of kinescope driver described in my co-pending U.S. Patent application referred to above, is provided to render the clamping portion of the driver operative during each horizontal retrace interval and for coupling an extra blanking signal to the driver to render the kinescope inoperative to produce an electron beam during the horizontal trace portions of each vertical retrace interval. The gating circuit is arranged to decouple the extra blanking signal from the driver during the horizontal retrace intervals so that the extra blanking signal does not interfere with the clamping operation of the driver.

These and other aspects of the present invention may be understood from the following detailed description in conjunction with the accompanying drawing which shows, partially in block diagram form and partially in schematic diagram form, the general arrangement of a color television receiver employing an apparatus constructed in accordance with the present invention.

Referring to the drawing, the general arrangement of a color television receiver employing the present invention includes a video processing unit 12 responsive to radio frequency (RF) television signals for generating, by means of suitable intermediate frequency circuits (not shown) and detection circuits (not shown), a composite video signal comprising chrominance, luminance, sound and synchronizing portions. The output signal processing unit 12 is coupled to a chrominance channel 14, including a chrominance processing unit 16 and to a luminance channel 18, including a luminance processing unit 20.

Chrominance processing unit 16 includes chroma demodulators (not shown) to derive color difference signals representing, for example, R-Y, B-Y and G-Y information. These color difference signals are applied to a kinescope driver 22, including stages 44a, 44b and 44c. The color difference signals are matrixed with the output signal, −Y, of luminance processing circuit 20 to produce color signals representing, for example, R, B and G information of appropriate polarity. The color signals are coupled to respective cathodes 38a, 38b and 38c of kinescope 24.

Luminance processing unit 20 serves to relatively attenuate undesirable signal portions, such as chrominance or sound signal portions or both, present in luminance channel 18, while amplifying and otherwise processing the video signals to produce the luminance signal, −Y.

A contrast control unit 26 is coupled to luminance processing unit 20 to control the amplitude of the luminance signals. A brightness control unit 28 is coupled to luminance processing unit 20 to control the DC component of the luminance signals.

The output of video processing unit 12 is also coupled to a sync separator 30 which separates horizontal and vertical synchronization pulses from the composite video signal. The synchronization pulses are coupled to horizontal deflection circuit 32 and vertical deflection circuit 34. Deflection circuits 32 and 34 are coupled to kinescope 24 and to a high voltage unit 36 to control the deflection of one or more electron beams generated by kinescope 24 in the manner previously discussed.

Deflection circuits 32 and 34 also generate horizontal and vertical blanking signals having durations respectively corresponding to the durations of the horizontal and vertical retrace intervals. The blanking signals are coupled to luminance processing unit 20 where they are combined with the luminance signals to form the luminance signal, −Y, a portion of which is shown in the drawing, including positive-going horizontal blanking pulses. In waveform −Y only horizontal blanking pulses are shown since there are a large number of horizontal blanking pulses, e.g., in the order of 250, between vertical blanking pulses. The vertical blanking pulses have the same amplitude as the horizontal blanking pulses but are longer in duration.

A horizontal flyback signal, as shown for example in the drawing, generated by horizontal deflection circuit 32 during each horizontal retrace interval, is coupled to gating circuit 62 to control its operation. The durations of the negative portions of the flyback pulse waveform are in time synchronism with the horizontal blanking pulses. Gating circuit 62 is coupled to stages 44a, 44b and 4c of kinescope driver 22 to control its operation as will be explained.

Kinescope 24 may, for example, be a multi-gun kinescope such as a delta-gun, shadow or slotted mask, or precision in-line kinescope or the like. The former is illustrated. Kinescope 24 contains a gun for each different phosphor, for instance, red, green and blue. As illustrated, each gun comprises a respective cathode 38a, 38b and 38c; control grid 40a, 40b and 40c; and screen grid 42a, 42b and 42c.

Bias control voltages are coupled to control grids 40a, 40b and 40c from bias control unit 41 and screen control voltages are coupled to screen grids 42a, 42b and 42c from screen control unit 43 to adjust the operating conditions of each gun.

Kinescope driver 22 includes stages 44a, 44b and 44c to drive, respectively, each gun of kinescope 24. Since the stages are similar, only stage 44a will be described in detail. Stage 44a comprises an NPN transistor 46a and an NPN transistor 48a. A PNP luminance amplifier transistor 50 common coupled to all three stages 44a, 44b and 44c is also provided.

With respect to stage 44a, transistors 46a and 50 have their emitter electrodes coupled together through a variable drive control resistor 52a. The base of transistor 46a is coupled through a capacitor 54a to the R-Y signal output of chrominance processing unit 16. The base of transistor 50 is direct current coupled to the output of luminance processing unit 20. The collector of transistor 46a is coupled through a resistor 56a to a source of positive-operating voltage (B+). The emitter of transistor 46a is coupled through a variable bias control resistor 58a to ground. The collector of transistor 46a is direct current coupled to the cathode 38a of the red (R) gun of kinescope 24.

Transistors 46a and 50 cooperate to combine the R-Y color difference signal and the luminance signal (−Y) to produce the R color signal at the collector of transistor 46a. Transistor 46a operates in a common emitter mode to amplify the R-Y color difference signal. By virtue of the emitter coupling of transistors 46a and 50, transistor 46a operates in a common base mode to amplify the luminance signal (−Y). The R, B and G signals, developed at the collectors of transistors 46a, 46b and 46c, are respectively coupled to the kinescope cathodes 38a, 38b, and 38c.

An NPN transistor 48a is arranged in feedback relation with NPN transistor 46a, the combination being coupled to resistor 60a and capacitor 54a to form a clamping circuit to maintain the operating point of stage 44a independent of the DC conditions of the R-Y output of chrominance processing unit 16 and the base-to-emitter voltage of transistor 46a.

The emitter of transistor 48a is coupled to the emitter of PNP transistor 64 of gating circuit 62. Gating circuit 62 serves to apply a reference voltage of the emitter of transistor 48a during each horizontal retrace interval to render it conductive. When transistor 48a is rendered conductive it cooperates with transistor 46a and capacitor 54a to clamp the emitter of transistor 46a to a voltage (the reference voltage plus the base-to-emitter voltage of transistor 48a) substantially independent of the DC conditions of the R-Y output of chrominance processing unit 16 and substantially independent of temperature induced variations of the base-to-emitter voltage of transistor 46a.

A detailed description of the operation of stage 44a is provided in my aforementioned U.S. Pat. application. Briefly, the cooperation of transistors 48a and 46a during the horizontal retrace interval may be understood by considering their arrangement as a negative feedback arrangement. Thus, for example, if the emitter voltage of transistor 46a decreases due to an increase of the voltage across the base-emitter junction of transistor 46a, the collector voltage of transistor 48a increases. As a result, the emitter voltage of transistor 46a increases.

Since the operating point of stage 44a is determined by the voltage developed at the emitter of transistor 46a, this operating point will be maintained substantially independent of the DC conditions of the R-Y output of chrominance processing unit 16 and of the base-to-emitter voltage of transistor 46a. Similarly, the operating point of stage 44b will be maintained substantially independent of the DC conditions of the B-Y output of chrominance processing unit 16 and the base-to-emitter voltage of transistor 46b and the operating point of stage 44c will be maintained substantially independent of the DC conditions of the G-Y output of chrominance processing unit 16 and the base-to-emitter voltage of transistor 46c.

Gating circuit 62 also serves to couple a signal which may be called an "extra blanking signal" to kinescope 24 to cut it off during the horizontal trace portions of each vertical retrace interval. In this manner, a disconcerting zig-zag trace pattern, due to the horizontal deflection of an electron beam which may otherwise be generated by kinescope 24, will not be formed.

Gating circuit 62 comprises a PNP transistor 64 having its emitter coupled to the emitters of transistors 48a, 48b and 48c and its collector coupled to ground. A horizontal flyback voltage waveform (as shown in the diagram) generated by horizontal deflection circuit 32 is coupled through a terminal 74, a resistor 72, a resistor 70 and a diode 66 to the base of transistor 64.

A diode 68 is coupled between the junction of resistors 70 and 72 and ground. Diode 68 serves to prevent the development of excessive negative voltages at the junction of resistors 70 and 72. Diode 66 serves to prevent the reverse breakdown of the base-to-emitter junction of transistor 64. A resistor 76 is coupled between a source of positive supply voltage (C+) and the junction of resistor 70 and diode 66.

The series connection of a resistor 86, a diode 80, and a resistor 82 is coupled between a source of positive supply voltage (D+) and the common junction of resistors 52a, 52b and 52c. The emitter of transistor 64 is coupled to the anode of diode 80.

The general arrangement shown in FIG. 1 is suitable for use in a color television receiver of the type shown, for example, in *RCA Color Television Service Data*, 1973, No. C-8 for a CTC-68 type receiver, published by RCA Corporation, Indianapolis, Indiana.

Before describing the operation of gating circuit 62, it is first noted that transistors 46a, 46b and 46c are biased to be slightly conductive during the occurrence of the horizontal blanking pulses included in luminance signal −Y by virtue of the connections of resistors 58a, 58b and 58c and associated bias components. This is desirable to enable the feedback interaction of transistors 46a, 46b and 46c with respective transistors 48a, 48b and 48c to clamp the respective emitters of transistors 46a, 46b and 46c substantially to the reference voltage provided by gating circuit 62 during the horizontal retrace interval. However, the continual conduction of transistors 46a, 46b and 46c presents the problem, as previously mentioned, that visible trace patterns may be generated in response to undesirable signals, such as noise, coupled to the respective bases of transistors 46a, 46b or 46c during the horizontal trace portions of the vertical retrace interval.

It is also noted that undesirable lines may be formed in response to undesirable signals coupled to the respective bases of transistors 46a, 46b and 46c during the horizontal retrace intervals. The formation of these horizontal retrace lines may be prevented in a number of ways. One such way is to provide apparatus for coupling additional blanking pulses to the grids of kinescope 24 to assure that it is cut off during the horizontal retrace interval. Such apparatus may, for example, be incorporated with bias control unit 41 or screen control unit 43.

It should also be noted that the problem of the formation of a zig-zag trace pattern may be further aggravated if such signals as vertical interval test signals (VITS), currently being proposed for calibrating television signal processing systems, are inclined in the composite video signal and coupled to chrominance channel 14.

In the operation of gating circuit 62, the horizontal flyback waveform shown in the diagram is coupled to terminal 74. During each horizontal trace interval, therefore, a positive voltage (e.g., +20 volts) is coupled to terminal 74. As a result, diode 68 is reverse biased and a positive voltage, determined by the magnitude of positive portions of the flyback signal and C+ and the values of resistors 70, 72 and 76 is developed at the cathode of diode 66. These components are selected to maintain diode 66 and transistor 64 relatively non-conductive. At the same time, a positive voltage determined by the voltage division of resistor 86 in series with the impedance formed by resistors 82, 52a, 52b, 52c, 58a, 58b and 58c and the impedance between the emitter and collector of transistor 50, is developed at the anode of diode 80 rendering it conductive. By virtue of the conduction of diode 80, a current from the source D+ is coupled to the emitters of transistors 46a, 46b and 46c. The amount of current coupled to the emitters of transistors 46a, 46b and 46c is primarily determined by the conduction of transistor 50 which shares the current supplied via diode 80.

The conduction of transistor 50 is controlled in response to luminance signal −Y. Signal portions in the direction of the blanking pulses, i.e., in the black direction, render transistor 50 less conductive than signals in the opposite, i.e., white direction.

In the amplitude range of −Y corresponding to signals between white and black (the black level being just below the maximum amplitude of the blanking pulses) little of the current from the source D+ is coupled to the emitters of transistors 46a, 46b and 46c since it is bypassed to ground by relatively conductive transistor 50. However, when the amplitude of the luminance signal exceeds the black level, a relatively large portion of the current from the source D+ is coupled to the emitters of transistors 46a, 46b and 46c, only a small portion of the current from the source D+ being bypassed to ground through relatively non-conductive or cut off transistor 50. As a result, the emitter voltage of transistors 46a, 46b and 46c tend to rise and those transistors are brought closer to or are at cut-off. The collector voltages of transistors 46a, 46b and 46c increase, tending to cut off the electron beams generated by the three guns of kinescope 24.

Thus, it may be stated that, during trace intervals, gating circuit 62 provides "extra black drive" capability. That is, during the horizontal trace interval corresponding to the interval between the horizontal blanking pulses, if the amplitude of luminance signal −Y exceeds the black level, the current coupled through diode 80 to the emitter of transistor 50 enables the voltages developed at the collectors of transistors 46a, 46b and 46c to rise higher that that which would otherwise be developed before transistor 50 is rendered cutoff. During the horizontal trace portions of the vertical retrace interval, vertical blanking pulses cause transistor 50 to be substantially cut off. Current is then supplied via diode 80 to drive transistors 46a, 46b and 46c to cut them off so that a disconcerting zig-zag trace pattern is not formed. The latter feature of gating circuit 62 may be called "extra blanking" capability.

During each horizontal retrace interval, the negative-going portions of the horizontal flyback signal are developed at terminal 74. Diode 68 is rendered conductive and a negative-going pulse, whose negative excursion is limited to ground potential less the voltage developed between the anode and cathode of diode 68, is developed at the cathode of diode 68. As a result, a negative-going pulse, whose amplitude is determined by C+ and the voltage division of resistors 70 and 76, is developed at the cathode of diode 66 causing transistor 64 to be rendered relatively conductive. Transistor 64 acts as an emitter-follower and couples the voltage developed at the cathode of diode 66 (plus the voltage developed between the anode and cathode of diode 66 and the emitter and base of transistor 64) to the emitters of transistors 48a, 48b and 48c. Transistors 48a, 48b and 48c are rendered conductive and respectively interact with conductive transistors 46a, 46b and 46c in a feedback manner to clamp the emitters of transistors 46a, 46b and 46c to a reference voltage substantially independent of the DC conditions of the R-Y, B-Y and G-Y outputs of chrominance processing unit 16 and the base-to-emitter voltages of transistors 46a, 46b and 46c.

The operation of transistors 48a, 48b and 48c causes the voltage developed at the emitter of transistor 64 during each horizontal retrace interval to back bias diode 80 and therefore render it non-conductive. As a result, the current coupled during the trace intervals to the emitters of transistors 46a, 46b and 46c from the source of D+ is decoupled and therefore cannot interfere with the clamping operation of stages 44a, 44b and 44c.

Typical values for various components of the arrangement of the receiver are shown in the diagram. The values of resistors 70, 72, 76, 82 and 86 are selected to render diodes 66 and 68 and transistors 64, 48a, 48b and 48c relatively non-conductive and diode 80 relatively conductive during each horizontal trace interval and to render transistors 64, 48a, 48b and 48c and diodes 66, 68 relatively conductive and diode 80 relatively nonconductive during each horizontal retrace interval.

Although the invention has been described in terms of the particular embodiment shown in the diagram, it should be understood that modifications to this embodiment are contemplated to be within the scope of the invention.

What is claimed is:

1. In a television processing system including a source of video signals, said video signals including vertical blanking pulses, horizontal blanking pulses disposed between said vertical blanking pulses, and image information signals disposed between said horizontal blanking pulses, a device for reproducing an image from video signals, said device including means for generating an electron current in response to said video signals; and scanning means for causing said current to sweep the image area of said device in a regular pattern including horizontal trace and retrace intervals and vertical trace and retrace intervals, apparatus comprising:

amplifying means for coupling said video signals to said image reproducing device;
   clamping means coupled to said amplifying means for periodically clamping a predetermined circuit point of said amplifying means to a reference voltage
   means for providing a control signal during said horizontal retrace intervals;
   means for providing a direct voltage; and
   gating means responsive to said control signal for coupling said reference voltage from said means for providing a direct voltage to said clamping means during said horizontal retrace intervals, said gating means including means coupled to said amplifying means for supplying an extra blanking signal to said image reproducing device to inhibit the generation of said electron current during each said vertical retrace interval, said supplying means being rendered inoperative to couple said extra blanking signal to said device during each said horizontal retrace interval in response to said control signal.

2. The apparatus recited in Claim 1 wherein said amplifying means includes means for bypassing said extra blanking signal to a point of reference potential during each horizontal trace interval.

3. The apparatus recited in claim 1 wherein said amplifying means and said clamping means are coupled together in a feedback configuration.

4. The apparatus recited in claim 1 wherein said video signals include chrominance signals and luminance signals, said luminance signals including said horizontal and vertical blanking pulses, and wherein said amplifying means includes a first and a second transistor of opposite conductivity type, the emitters of said first and second transistors being direct current coupled, said chrominance signals being coupled to the base of said first transistor, said luminance signals being coupled to the base of said second transistor, the collector of said first transistor being coupled to said image reproducing device.

5. The apparatus recited in claim 4 wherein said clamping means includes means for capacitively coupling said chrominance signals to the base of said first transistor; and a third transistor of like conductivity type to that of said first transistor, the base of said third transistor being direct current coupled to the emitter of said first transistor, the collector of said third transistor being direct current coupled to the base of said first transistor, the emitter of said third transistor coupled to said gating means.

6. The apparatus recited in claim 5 wherein said amplifying means includes means for biasing said first transistor for substantially continuous conduction.

7. The apparatus recited in claim 5 wherein said extra blanking signal supplying means includes a normally conducting coupling device coupled between a source of fixed voltage and the emitter of said first transistor; said gating means includes means responsive to said scanning means for providing said reference voltage during said horizontal retrace interval, and a normally non-conducting coupling device coupled between said means for providing said direct voltage and the emitter of said third transistor, said normally nonconducting coupling device also being coupled to said normally conducting coupling device, said normally nonconducting coupling device being rendered conductive in response to said direct voltage to couple said reference voltage to the emitter of said third transistor; and said normally conducting coupling device being rendered nonconductive in response to said direct voltage.

8. The apparatus recited in claim 7 wherein said normally conductive coupling device is a unidirectional coupling device; and wherein said normally nonconductive coupling device includes a fourth transistor the base of said fourth transistor being coupled to said means for providing said direct voltage, the emitter of said fourth transistor being coupled to the emitter of said third transistor and said unidirectional coupling device, said fourth transistor being normally nonconductive, said fourth transistor being rendered conductive in response to said direct voltage.

9. In a television processing system including a source of composite video signals, said composite video signals including chrominance signals, luminance signals having vertical blanking pulses, horizontal blanking pulses disposed between said vertical blanking pulses and image formation signals disposed between said horizontal blanking pulses, a kinescope for reproducing an image from said video signals, said kinescope including means for generating at least one electron beam in response to said video signals, and means for deflecting said electron beam over an image reproducing area during horizontal trace and retrace intervals and during vertical trace and retrace intervals, apparatus comprising:

first and second transistors of opposite conductivity type, the emitter of said first transistor being direct current coupled to the emitter of said second transistor, the collector of said first transistor being coupled to said kinescope, said luminance signals being coupled to the base of said second transistor;
   means for capacitively coupling said chrominance signals to the base of said first transistor;
   a third transistor of like conductivity type to that of said first transistor, the base of said third transistor being direct current coupled to the emitter of said first transistor, the collector of said third transistor being direct current coupled to the base of said first transistor;
   coupling means, including a unidirectional coupling device, direct current coupled between a fixed voltage source and the emitter of said first transistor;
   a fourth transistor of like conductivity type to that of said second transistor, the emitter of said fourth transistor being direct current coupled to the emitter of said second transistor and said unidirectional coupling device;

means coupled to said deflection means for coupling a predetermined voltage to the base of said fourth transistor during each said horizontal retrace interval to render said fourth transistor conductive, said unidirectional device being rendered non-conductive in response to said predetermined voltage.

10. The apparatus recited in claim 9 including means for biasing said first transistor for substantially continuous conduction.

* * * * *